(12) United States Patent
Bohn (10) Patent No.: US 9,223,441 B1
(45) Date of Patent: Dec. 29, 2015

(54) DETECTION SURFACE FOR A COMPUTING DEVICE

(71) Applicant: Microsoft Corporation, Redmond, WA (US)

(72) Inventor: David D. Bohn, Fort Collins, CO (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/454,583

(22) Filed: Aug. 7, 2014

(51) Int. Cl.
*G06F 3/042* (2006.01)
*G01S 17/08* (2006.01)
*G01S 7/48* (2006.01)
*G01S 7/481* (2006.01)

(52) U.S. Cl.
CPC .............. *G06F 3/0421* (2013.01); *G01S 7/4808* (2013.01); *G01S 7/4816* (2013.01); *G01S 17/08* (2013.01)

(58) Field of Classification Search
CPC .... G06F 3/0421; G06F 3/0428; G06F 3/0412
See application file for complete search history.

(56) References Cited

U.S. PATENT DOCUMENTS

| | | | |
|---|---|---|---|
| 6,419,340 B1 * | 7/2002 | Wickham et al. | 347/15 |
| 6,972,753 B1 * | 12/2005 | Kimura et al. | 345/175 |
| 8,054,300 B2 | 11/2011 | Bernstein | |
| 2008/0158172 A1 | 7/2008 | Hotelling et al. | |
| 2009/0033623 A1 * | 2/2009 | Lin | 345/158 |
| 2011/0007021 A1 | 1/2011 | Bernstein et al. | |
| 2012/0038751 A1 * | 2/2012 | Yuan et al. | 348/51 |
| 2012/0229384 A1 * | 9/2012 | Nakane et al. | 345/158 |
| 2013/0093708 A1 | 4/2013 | Annett et al. | |
| 2014/0291480 A1 * | 10/2014 | Bruder et al. | 250/206 |

OTHER PUBLICATIONS

Suh, et al., "Mobile LCD Device with Transparent Infrared Image Sensor Panel for Touch and Hover Sensing", In IEEE International Conference on Consumer Electronics, Jan. 13, 2012, pp. 217-218.
Wang, et al., "Bare Finger 3D Air-Touch System Using an Embedded Optical Sensor Array for Mobile Displays", In Journal of Display Technology, vol. 10, Issue 1, Jan. 2014, pp. 13-18.

(Continued)

*Primary Examiner* — Richardo L Osorio
(74) *Attorney, Agent, or Firm* — Gregg Wisdom; Judy Yee; Micky Minhas (57) ABSTRACT

A system determines a position of one or more objects relative to a detection surface. An illumination source is located at a first fixed position relative to the detection surface, and configured to illuminate an adjacent coordinate space. Two or more single-pixel optical sensors are located at fixed positions relative to the detection surface such that each point of the illuminated coordinate space is within a field of view of at least two single-pixel optical sensors. Each single-pixel optical sensor detects illumination reflected off an object within the coordinate space, and outputs information useable to assess a time-of-flight of the detected reflected illumination. A controller assesses a radial distance between each single-pixel sensor and the object based at least in part on the time-of-flight of the detected reflected illumination, and determines a position of the object in the coordinate space based at least in part on the radial distances.

20 Claims, 5 Drawing Sheets

(56) References Cited

OTHER PUBLICATIONS

Colaco, Andrea, "Sensor Design and Interaction Techniques for Gestural Input to Smart Glasses and Mobile Devices", In Proceedings of 26th Annual ACM Symposium on User Interface Software and Technology, Oct. 8, 2013, pp. 49-52.

Chen, et al., "uTouch: Sensing Touch Gestures on Unmodified LCDs", In Proceedings of ACM SIGCHI Conference on Human Factors in Computing System, Apr. 27, 2013, 4 pages.

* cited by examiner

DETECTION SURFACE FOR A COMPUTING DEVICE

BACKGROUND

Detection surfaces are employed in a wide range of computing devices to receive touch and gesture input from a user. Touch and gesture inputs are intuitive means of interacting with a computing device, but rely on accurate detection of the location of objects to allow for successful input recognition.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A system determines a position of one or more objects relative to a detection surface. An illumination source is located at a first fixed position relative to the detection surface, and configured to illuminate an adjacent coordinate space. Two or more single-pixel optical sensors are located at fixed positions relative to the detection surface and arranged such that each point of the coordinate space which the first illumination source is configured to illuminate is within a field of view of at least two of the two or more single-pixel optical sensors. Each single-pixel optical sensor detects illumination reflected off an object within the coordinate space, and outputs information useable to assess a time-of-flight of the detected reflected illumination. A controller assesses a radial distance between each single-pixel sensor and the object based at least in part on the time-of-flight of the detected reflected illumination, and determines a position of the object in the coordinate space based at least in part on the radial distances.

DETAILED DESCRIPTION

The present disclosure is directed to systems for determining touch and hover input relative to a detection surface, and in particular, to using single-pixel optical sensors to determine radial distances between the an object and a sensor based at least in part on a time-of-flight of illumination reflected off the object.

Detection surfaces are used in a variety of devices, including trackpads, mobile phones, tablet computers, and large scale display surfaces. Using touch based and hover based inputs, the detection surface allows for an intuitive means for a user to provide commands to a computing device. However, as the size of a detection surface increases, the power and cost necessary to provide accurate touch and hover detection increases drastically. Providing high-resolution capacitance based touch detection may be extremely costly for a large surface. Further, the range of hover detection for a capacitance-based input system may be limited to a small distance away from the surface.

According to this disclosure, time-of-flight technology may be incorporated into a detection surface. One or more illumination sources may be used to illuminate a coordinate space in two or three dimensions adjacent to the display surface. The illumination will reflect off of objects entering the coordinate space. Single-pixel optical sensors may be deployed to detect the reflected illumination. The time-of-flight of the reflected illumination may then be used to determine radial distances between the object and the optical sensors. In turn, the radial distances may be used to determine a position of the object within the coordinate space, for example, using triangulation based at least in part on the locations of the single-pixel optical sensors. This allows for low-cost, high-resolution touch and hover input for detection surfaces, including large-scale display surfaces.

FIGS. 1A-1D show a schematic depiction of a detection surface 10 configured to determine a position of one or more objects relative to the detection surface, such as a finger of user 11. Detection surface 10 may be coupled to one or more computing systems configured to respond to input received at the detection surface. Detection surface 10 comprises an active detection area 12. Detection surface 10 further comprises an inactive area 15, although in other examples, the totality of detection surface 10 may be configured as an active detection area. Inactive area 15 comprises a perimeter that surrounds the active detection area. Inactive area 15 may be configured to be flush with active detection area 12, may protrude outwards from the active detection surface, or may be recessed from the active detection surface. In some examples, active detection area 12 may not include a physical surface. Rather, active detection area 12 may be defined as a region within inactive area 15 where input may be detected by components housed within the inactive area.

Figure 1A:
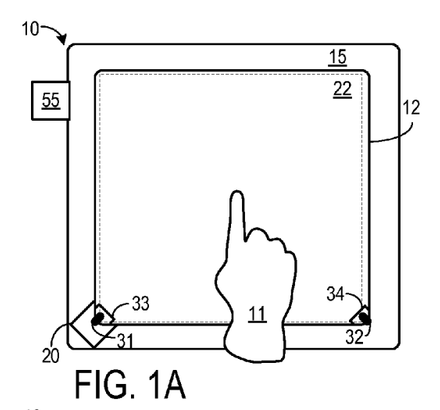
FIGS. 1A-1D schematically show a detection surface configured to determine a location of one or more objects in proximity to the detection surface.

Detection surface 10 may be configured as a display surface. For example, detection surface 10 may be included in a smart-phone, tablet computer, global positioning system, personal digital assistant, portable media player, large-scale display surface, etc. In other examples, detection surface 10 may be configured as a touchpad, trackpad or other input device without display functionality.

Detection surface 10 includes illumination source 20. Illumination source 20 is located at a first fixed position relative to the detection surface. In this context, a fixed position indicates that the location of the illumination source relative to the detection surface is known with sufficient precision, but it should be understood that components may be placed at any appropriate location relative to the detection surface. In this example, illumination source 20 is shown within inactive area 15, although in other examples, illumination source 20 may be within active detection area 12. For example, illumination source 20 may be embedded under a glass surface of active detection area 12. Illumination source 20 is configured to illuminate at least a portion of a coordinate space 22 located adjacent to the detection surface.

In this example, illumination source 20 is configured to illuminate a coordinate space comprising a two-dimensional space located parallel to the detection surface. More specifically, coordinate space 22 comprises a plane located parallel to active detection area 12. In this example, active detection area 12 and coordinate space 22 are smaller than detection surface 10, but in other examples, the active detection area and coordinate space may be equal in size to, or greater in size than the area of detection surface 10. Illumination source 20 may comprise one or more LEDs, near IR edge emitting lasers, vertical-cavity surface emitting lasers (VSCELs), or other sources of visible, IR, NIR, or UV light. Illumination source 20 may output illumination as a continuous illumination stream, or as a series of illumination pulses.

Figure 1B:
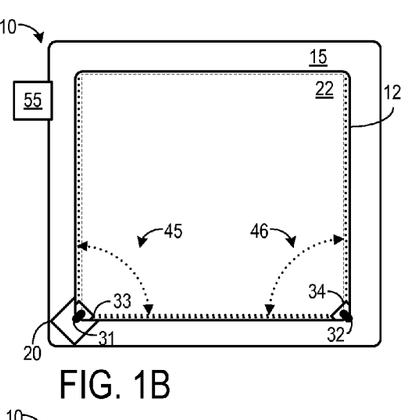

Detection surface 10 includes single-pixel optical sensors 31 and 32. Single-pixel optical sensors 31 and 32 are located at fixed positions relative to the detection surface. In this example, single-pixel optical sensor 31 is located at the first fixed position relative to the detection surface occupied by illumination source 20, while optical sensor 32 is located at a known position relative to the first fixed position. Single-pixel optical sensors 31 and 32 view the coordinate space through apertures 33 and 34 respectively. Apertures 33 and 34 are configured to limit the field of view of single-pixel optical sensors 31 and 32. As shown in FIG. 1B, single-pixel optical sensor 31 has a field of view 45, while single-pixel optical sensor 32 has a field of view 46, as indicated by the dotted lines and arcs. In this configuration, both single-pixel optical sensors have a 90° field of view, but in other configurations, the field of view may be lesser or greater. The single-pixel optical sensors may be configured with collection optics such that the illumination within a field of view is directed to a single-pixel. In some examples, the apertures may be configured to vary the field of view of the single-pixel optical sensors over time. In the configuration shown in FIG. 1B, each point of coordinate space 22 that is illuminated by illumination source 20 is within a field of view of two single-pixel optical sensors. The aperture may limit the field of view of the single-pixel optical sensors such that the field of view comprises only the coordinate space illuminated by illumination source 20. In some examples, apertures 33 and 34 may be further configured to shutter single-pixel optical sensors 31 and 32 at a gating frequency. The gating frequency may be based at least in part on a pulsation frequency of illumination source 20.

Figure 1C:
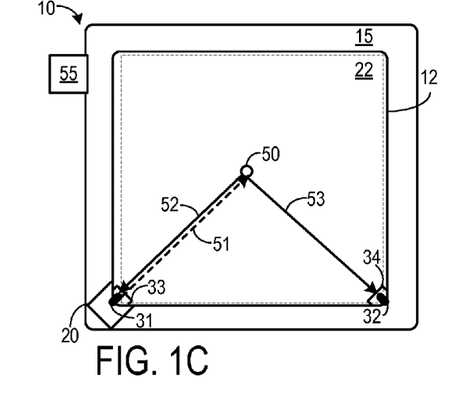

Single-pixel optical sensors 31 and 32 may be configured to detect illumination reflected off an object located within coordinate space 22. As shown in FIG. 1C, object 50 may be illuminated by illumination 51 output by illumination source 20. Illumination 51 may then reflect off of object 50, returning as reflected illumination 52 to single-pixel optical sensor 31 and as reflected illumination 53 to single-pixel optical sensor 32. Each single-pixel optical sensor may be configured to output information useable to assess a time-of-flight of the detected reflected illumination. The time-of-flight of the detected reflected illumination may be output to a controller 55 configured to assess a radial distance between the single-pixel sensor and the object based at least in part on the time-of-flight of the detected reflected illumination. The information useable to assess a time-of-flight of the detected reflected illumination may include a signal indicating a relative amount of illumination detected by the single-pixel optical sensor during a gating period. The controller may then determine the time-of-flight of the detected reflected illumination based at least in part on the signal.

Figure 1D:
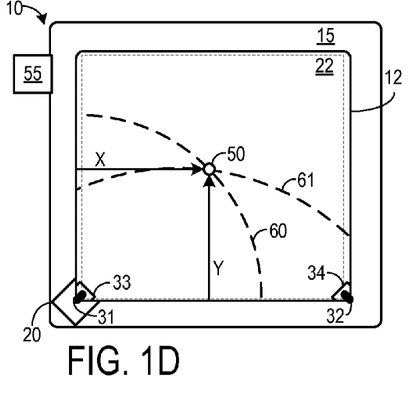

Single-pixel optical sensor 31 may be configured as a master single-pixel optical sensor and single-pixel optical sensor 32 may be configured as a slave single-pixel optical sensor coupled to the master single-pixel optical sensor via a clock signal. The clock signal may function to synchronize the master and slave single-pixel optical sensors. For example, if the single-pixel optical sensors are shuttered by apertures at a gating frequency, the timing of the aperture gating may be based at least in part on the clock signal. In this way, the time-of-flight information for both single-pixel optical sensors may be internally calibrated. As single-pixel optical sensor 31 is located at the first fixed position occupied by illumination source 20, the time-of-flight of reflected illumination 52 directly correlates to the radial distance 60 between object 50 and single-pixel optical sensor 32, as shown in FIG. 1D. Radial distance 61 may be determined based at least in part on the time of flight of reflected illumination 53, and further based at least in part on the distance between single-pixel optical sensor 32 and illumination source 20. Controller 55 may then determine a position of object 50 within coordinate space 22 based at least in part on the radial distances between object 50 and single-pixel optical sensors 31 and 33. For example, controller 55 may determine X and Y coordinates for the object based at least in part on the radial distances. For example, controller 55 may determine X and Y coordinates using triangulation based at least in part on the known distance between optical sensors 31 and 33. In some examples, active detection area 12 may comprise a contact sensor, such as a capacitive or pressure sensor, to further indicate that object 50 is in contact with detection surface 10.

FIGS. 2A-E show an example detection surface 110 comprising an active detection area 112 and an inactive area 115. In this example, detection surface 110 comprises a plurality of illumination modules 120a-120j. Illumination modules 120a-120e are located within inactive area 115 on a first side of detection surface 110, while illumination modules 120f-120i are located within inactive area 115 on a second side of detection surface 110, opposite the first side. Illumination modules may also be located on the third and fourth sides of detection surface 110, and/or on adjacent sides of detection surface 110.

Figure 2A:
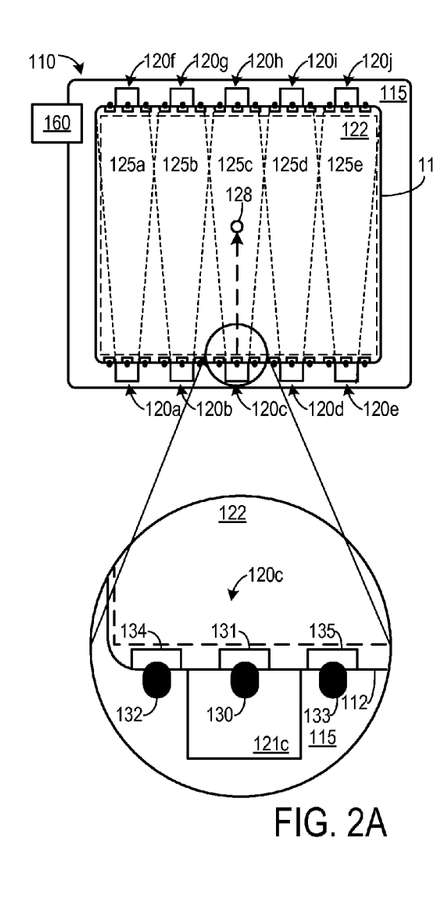
FIGS. 2A-2E schematically show another detection surface configured to determine the location of one or more objects in proximity to the detection surface.
Figure 2B:
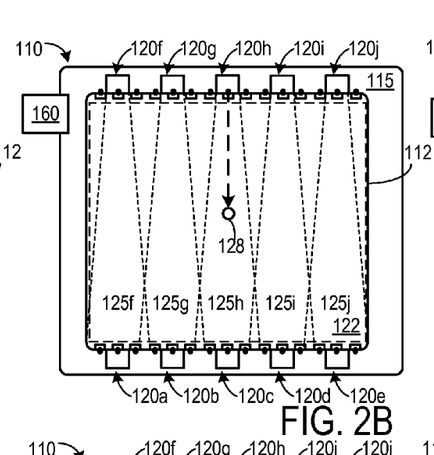

Each illumination module includes an illumination source. For example, as shown in the inset of FIG. 2A, illumination module 120c includes illumination source 121c. Each illumination source is located at a unique location relative to the detection surface, and configured to illuminate at least a portion of a coordinate space 122 located adjacent to the detection surface. For example, as shown in FIG. 2A, the illumination source of illumination module 120a illuminates portion 125a, the illumination source of illumination module 120b illuminates portion 125b, etc. As shown in FIG. 2B, the illumination source of illumination module 120f illuminates portion 125f, the illumination source of illumination module 120g illuminates portion 125g, etc. In this way, illuminated portions may overlap, such that locations within coordinate space 122 may be illuminated by two or more illumination sources. Thus, objects in the coordinate space may be illuminated by two or more illumination sources. For example, object 128 is illuminated by the illumination sources for both illumination modules 125c and 125h, as shown in FIGS. 2A and 2B.

Each illumination source may be configured to output illumination with at least one property unique to that illumination source. For example, each illumination source may output illumination with a unique wavelength. In some examples, each illumination source may output illumination pulsations, a timing of the illumination pulsations for each illumination source offset from the illumination pulsations output by each other illumination source. The illumination sources may be communicatively coupled together by a clock signal configured to coordinate the timing of the illumination pulsations for each illumination source. For example, the pulsations may be offset in phase such that a single-pixel optical sensor configured to view illumination output by two or more illumination sources could distinguish the illumination source of origin of any detected reflected illumination, based at least in part on the timing of the illumination pulsations.

Each illumination module may include a master single-pixel optical sensor. Each illumination source may be paired with a master single-pixel optical sensor located at the unique location occupied by the illumination source. For example, as shown in the inset of FIG. 2A, illumination source 121c is paired to master single-pixel optical sensor 130, which views coordinate space 122 through aperture 131. Each master single-pixel optical sensor may thus be configured to detect illumination output by the paired illumination source that has been reflected off a nearest object within the coordinate space. In examples where each illumination source is configured to output a unique wavelength, the master single-pixel optical sensor paired to the illumination source is configured to detect illumination with that wavelength. In examples where each illumination source outputs illumination pulsations, the aperture for the master single-pixel optical sensor paired to the illumination source may be configured to shutter the optical system in coordination with the illumination pulsations. In this way, although the field of view for each master single-pixel optical sensor may comprises a portion of the coordinate space illuminated by more than one illumination source, the master single-pixel optical sensor may only detect illumination output by its respective paired illumination source.

Each illumination module may further include one or more slave single-pixel optical sensors. Each master single-pixel optical sensor may be communicatively coupled to one or more slave single-pixel optical sensors via a clock signal, the one or more slave single-pixel optical sensors located at known positions relative to the coupled master single-pixel optical sensor. For example, as shown in the inset of FIG. 2A master single-pixel optical sensor 130 is communicatively coupled to slave single-pixel optical sensors 132 and 133. Single-pixel optical sensors 132 and 133 view coordinate space 122 through apertures 134 and 135, respectively. Although in this example, the slave single-pixel optical sensors are located adjacent to their master single-pixel optical sensor, in other examples, the slave single-pixel optical sensors may be located at other positions within detection surface 110. For example, the slave single-pixel optical sensors may be spaced at a distance (e.g. 1 cm, 2 cm, 5 cm, 10 cm, or more) from the master single-pixel optical sensor based at least in part on the size, shape, and configuration of the detection surface and active detection area. Indeed, as the distance between the slave single-pixel optical sensors and the master single-pixel optical sensor increases, the accuracy of triangulation calculations may increase, leading to a more precise assignment of a location to an object in the coordinate space. For examples where two or more slave single-pixel optical sensors are communicatively coupled to a master single-pixel optical sensor, each slave single-pixel optical sensor may be located at an equal distance from the master single-pixel optical sensor, or may each be located at different distances from the master single-pixel optical sensor.

Figure 2C:
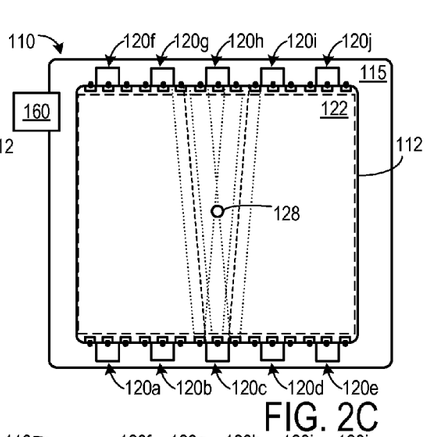
Figure 2D:
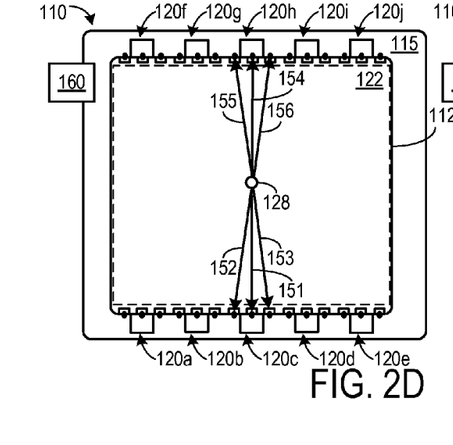

Similar to the master single-pixel optical sensor, each slave single-pixel optical sensor may be configured to detect illumination output by the paired illumination source that has been reflected off a nearest object within coordinate space 122. As shown in FIG. 2C, the fields-of-view (indicated by dotted lines) of the master and slave single-pixel optical sensors may overlap. As shown in FIG. 2D, object 128 reflects light back to master single-pixel optical sensor 130 as well as slave single-pixel optical sensors 132 and 133 along reflection paths 151, 152, and 153, respectively. Further, object 128 reflects illumination originating from illumination module 120h back to the master and slave single-pixel optical sensors paired to that illumination module along reflection paths 154, 155, and 156.

Figure 2E:
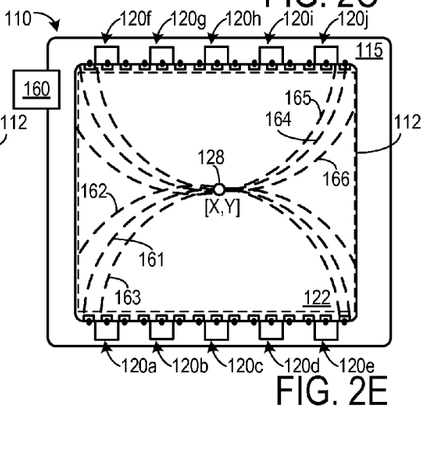

The master and slave single-pixel optical sensors may be further configured to output information useable to assess a time-of-flight of the detected reflected illumination. Further, a controller 160 may assess a radial distance between each master and slave single-pixel sensor and a nearest object in coordinate space 122 based at least in part on the time-of-flight of the detected reflected illumination, and then determine a position of one or more objects in coordinate space 122 based at least in part on the radial distances between the one or more objects and the master and slave single-pixel optical sensors, using triangulation based at least in part on the relative positions of the master and slave single-pixel optical sensors, for example. As shown in FIG. 2E, radial distances 161, 162, and 163 may be determined based at least in part on the time-of flight of reflected illumination for single-pixel optical sensors 130, 132, and 133, respectively. Similarly, radial distances 164, 165, and 166 may be determined based at least in part on the time-of flight of reflected illumination for the single-pixel optical sensors paired to illumination module 120h. The radial distances may then be used to determine an [X,Y] location of object 128 within the coordinate space.

Although in this example, each illumination source is paired to both master and slave single-pixel optical sensors, in some examples, each illumination source may only be paired to a master single-pixel optical sensors. For example, if each point of the coordinate space is illuminated by two or more illumination sources, the radial distances between the two or more paired master single-pixel optical sensors may be adequate to determine an [X,Y] location of one or more objects located within the coordinate space.

Figure 3A:
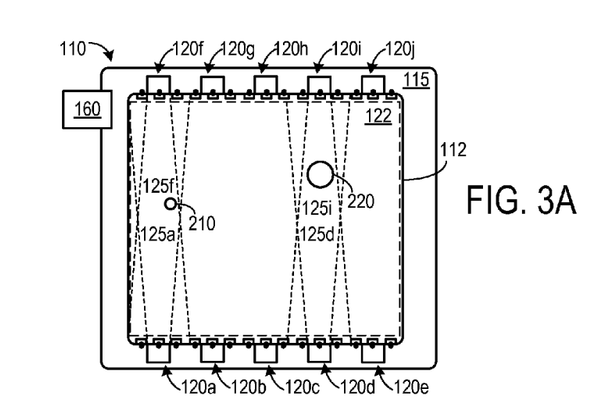
FIGS. 3A-3D schematically show the detection surface of FIGS. 2A-2E configured to determine the location of two or more objects in proximity to the detection surface.
Figure 3B:
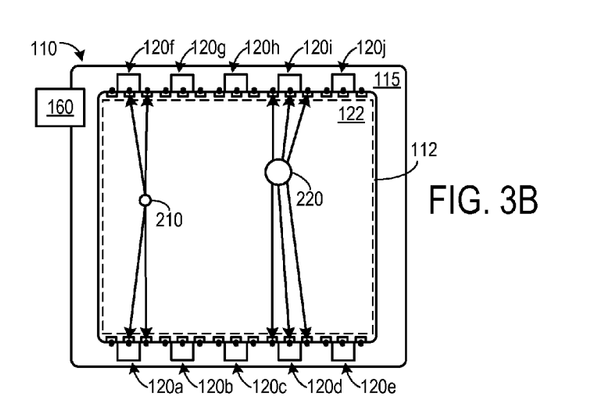
Figure 3C:
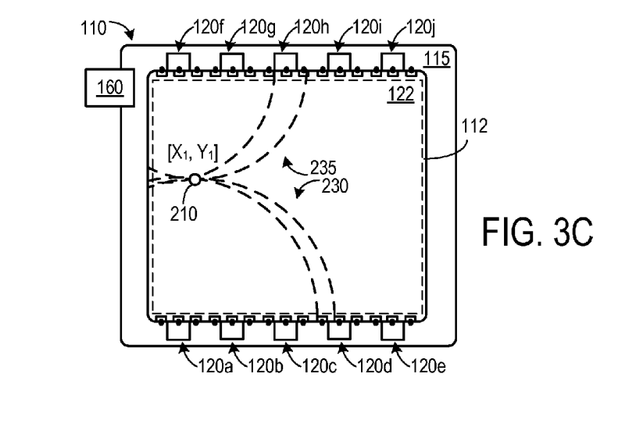

FIGS. 3A-3D schematically show detection surface 110 in an implementation where two or more objects may be detected in a coordinate space adjacent to the detection surface. FIG. 3A shows objects 210 and 220 located in unique positions in coordinate space 122. Object 210 is located within illumination portions 125a and 125f and is thus illuminated by illumination modules 120a and 120f, while object 220 is located within illumination portions 125d and 125i, and thus illuminated by illumination modules 120d and 120i. FIG. 3B shows light reflected off of object 210 as detected by master and slave single pixel sensors paired to illumination modules 120a and 120f, as well as light reflected off of object 220 as detected by master and slave single pixel sensors paired to illumination modules 120d and 120i. As shown in FIG. 3C, the location of object 210 may be determined by radial distances between the object and the single-pixel optical sensors, the radial distances based at least in part on the time-of-flight of the detected reflected illumination using triangulation based at least in part on the relative positions of the master and slave single-pixel optical sensors, for example. Both a first set of radial distances 230 and a second set of radial distances 235 indicate a coordinate position $[X_1, Y_1]$ that may be determined by controller 160.

Figure 3D:
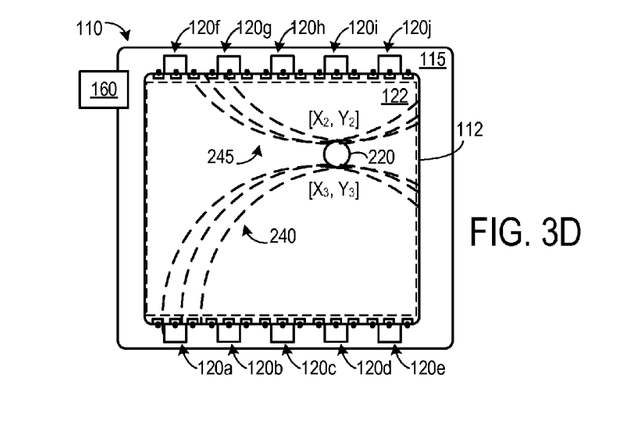

In contrast, the diameter of object 220 is significantly greater than the diameter of object 210. As such, the point of object 220 that is nearest to illumination module 120d may have a different coordinate position than the point of object 220 that is nearest to illumination module 120i. As shown in FIG. 3D, the radial distances 240 indicating the distance between object 220 and the single-pixel optical sensors paired to illumination module 120d suggest object 220 is located at [$X_2, Y_2$], while the radial distances 245 indicating the distance between object 220 and the single-pixel optical sensors paired to illumination module 120i suggest object 220 is located at [$X_3, Y_3$].

As such, the determined position of object 220 may be adjusted based at least in part on an indication that a diameter of object 220 is greater than a threshold. In some examples, contact sensors coupled to active detection area 112 may be used to ascertain the number of objects in contact with detection surface 110. In this way, it may be possible to distinguish between an object having a diameter greater than a threshold and two or more objects located proximal to each other. Detection surface 110 may be calibrated for individual users based at least in part on the size of the user's fingers and/or any styli or objects used to interact with the detection surface.

FIGS. 4A-4E schematically show a detection surface 410 configured to determine a three-dimensional location of one or more objects in proximity to the detection surface. Detection surface 410 comprises an active detection area 412 and an inactive area 415. In this example, detection surface 410 comprises a plurality of illumination modules 420a-420j. Illumination modules 420a-420e are located within inactive area 415 on a first side 416 of detection surface 410, while illumination modules 420f-420j are located within inactive area 415 on a second side 417 of detection surface 410, opposite the first side. Illumination modules may also be located on the third side 418 and fourth side 419 of detection surface 410, and/or on adjacent sides of detection surface 410. Each illumination module in this example comprises an illumination source located at a fixed position relative to the detection surface, a master single-pixel optical sensor located at the fixed position, and two slave single-pixel optical sensors located at known positions relative to the fixed position of the illumination source and communicatively coupled to the master single-pixel optical sensor via a clock signal. Each single-pixel optical sensor may view coordinate space 430 through an aperture configured to limit the field of view of the single-pixel optical sensor. Although the illumination modules are shown within inactive area 415, in other configurations, the illumination modules may be placed within the active detection area 412, for example, embedded under a glass surface.

Figure 4A:
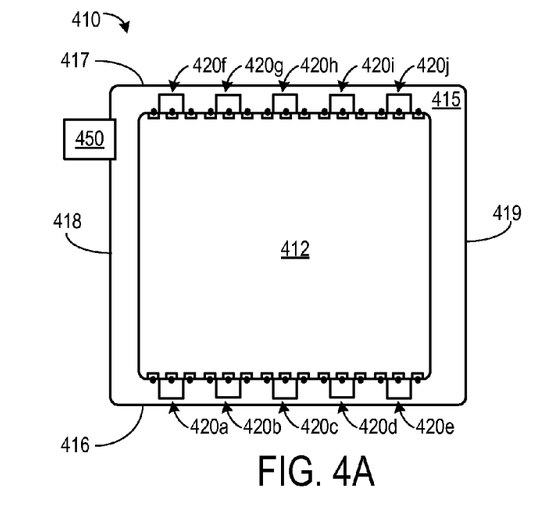
FIGS. 4A-4E schematically show a detection surface configured to determine the three-dimensional location of one or more objects in proximity to the detection surface.
Figure 4B:
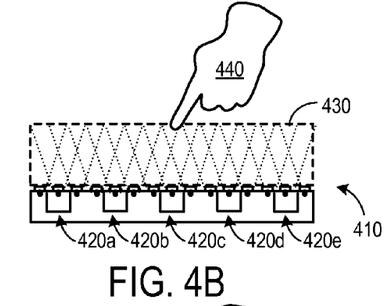
Figure 4C:
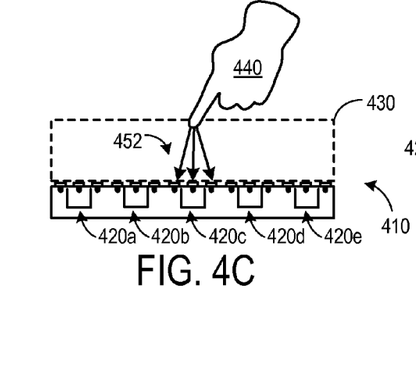
Figures 4D, 4E:
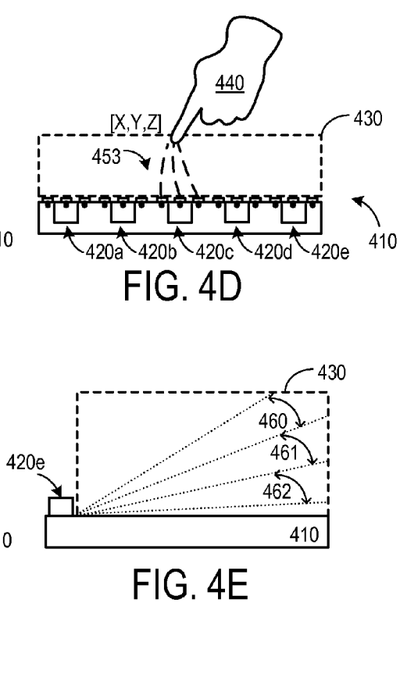

FIGS. 4B-4D show perspective views of detection surface 410 as viewed from side 416. The illumination sources within the illumination modules are each configured to illuminate at least a portion of coordinate space 430 located adjacent to the detection surface. In this example, coordinate space 430 is a three-dimensional space adjacent to detection surface 410. Coordinate space 430 may be configured as a cuboid, cylindrical, or prismic space adjacent to the detection surface with a base that is greater, smaller, or equal in area to detection surface 410. In some examples, coordinate space 430 may be configured as a frusto-pyramidal or frusto-conical space adjacent to the detection surface. In such configurations, the base located distal from the detection surface may be larger or smaller than the base located proximal to the detection surface. As shown by the dotted lines in FIG. 4B, each single-pixel optical sensor is configured with a field of view extending away from detection surface 410 and into coordinate space 430. In this way, an object, such as a finger of user 440 may be detected at a distance from detection surface 410, and a position of the object may be determined in three dimensions, including an X,Y coordinate relative to the plane of active detection area 412, and a Z coordinate indicating the distance of the object from detection surface 410.

Similar to detection surfaces 10 and 110, detection surface 410 may comprise a controller 450 configured to assess a radial distance between the single-pixel sensors and the object based at least in part on the time-of-flight of detected reflected illumination. As shown in FIG. 4C, light from the illumination source of illumination module 420c reflects off of a finger of user 440. The reflected illumination 452 is detected by the master and slave single pixel sensors of illumination module 420c and used to output information useable to assess a time-of-flight of the detected reflected illumination. As shown in FIG. 4D, the time-of-flight information may be used to assess radial distances 453 between the single-pixel sensors and the object. The radial distances may then be used to determine a position in three-dimensions of the object in the coordinate space using multilateration based at least in part on the relative positions single-pixel optical sensors, for example.

This configuration allows detection surface 410 to receive input from objects hovering within the coordinate space. Multiple objects may be detected and tracked over time, allowing detection surface 410 to recognize gestures. A contact sensor may be included in active detection area 412 to determine touch input. Additionally or alternatively, touch input may be determined based at least in part on the distance of an object from the detection surface (e.g. the Z coordinate) being less than a threshold.

FIG. 4E shows a partial view of detection surface 410 as viewed from side 419. Illumination module 420e is shown having multiple fields of view in coordinate space 430 (460, 461, and 462) originating from a single fixed location. Although only a single illumination module is shown, some or all of the illumination modules may be configured in this manner. Fields of view 460, 461, and 462 each comprise a different minimum and maximum distance from detection surface 410. In some examples, this may be accomplished by a single-pixel optical sensor being coupled to a motor or variable aperture configured to alter the field of view of the sensor. For example, a single-pixel optical sensor may initially start in a configuration comprising field of view 460. As objects are detected passing through coordinate space 430 towards detection surface 410, the field of view may shift to field of view 461 and then to field of view 462. In this way, the illumination module may be able to track an object approaching the detection surface. In other configurations, illumination module 420e may comprise multiple single-pixel optical sensors stacked together at a shared [X,Y] coordinate relative to the detection surface, each with a unique field of view. In this way, the depth of object detection within coordinate space 430 may be increased. Further, this may allow for multiple levels of input. For a display surface, detecting an object approaching a menu may allow for the menu to open prior to the object reaching the detection surface. The user may then select a menu option with a touch input without first having to open the menu with a touch input.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
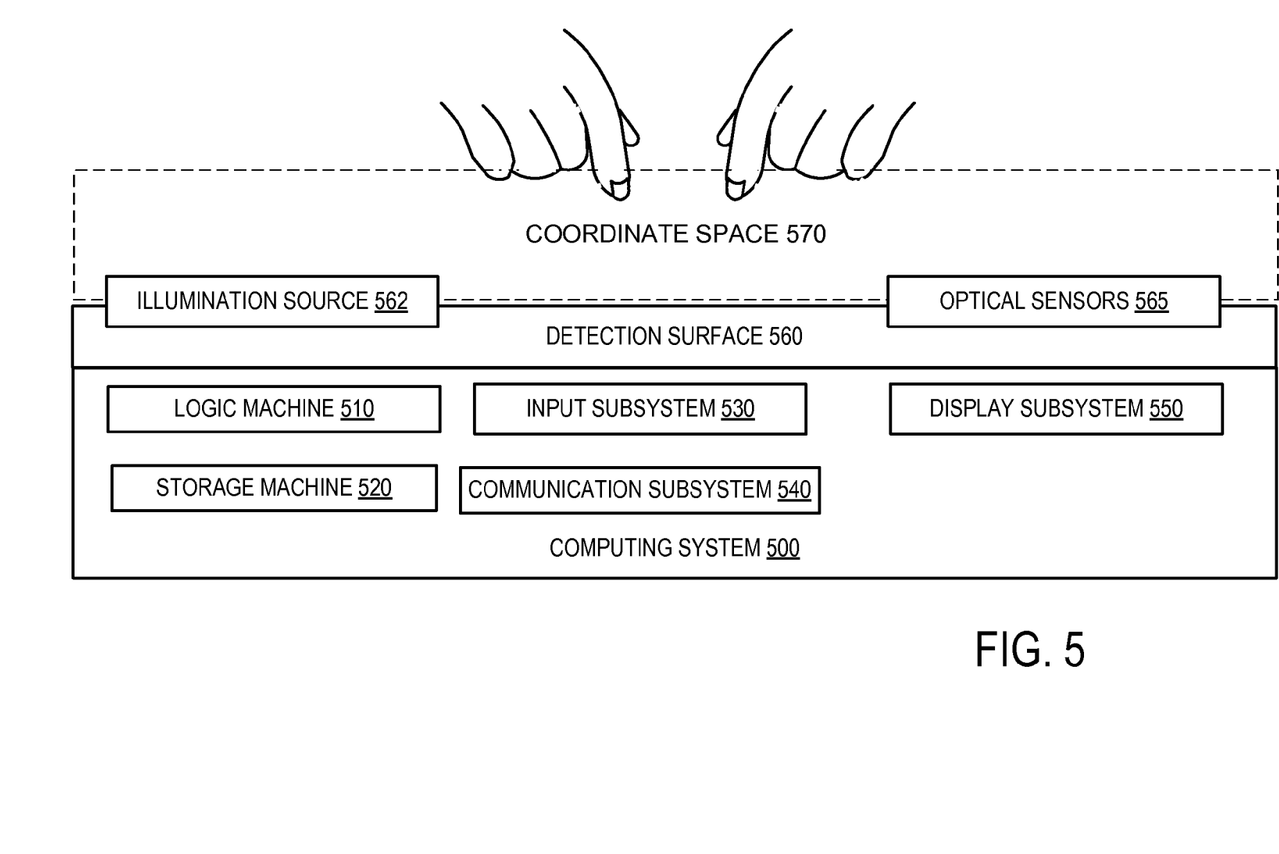
FIG. 5 schematically shows an example computing device including a detection surface.

FIG. 5 schematically shows a non-limiting embodiment of a computing system 500 that can enact one or more of the methods and processes described above. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic machine 510 and a storage machine 520. Computing system 500 further includes input subsystem 530, and may optionally include a communication subsystem 540, display subsystem 550 and/or other components not shown in FIG. 5

Logic machine 510 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 520 includes one or more physical devices configured to hold instructions executable by the logic machine to implement the methods and processes described herein. When such methods and processes are implemented, the state of storage machine 520 may be transformed—e.g., to hold different data.

Storage machine 520 may include removable and/or built-in devices. Storage machine 520 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 520 may include volatile, nonvolatile, dynamic, static, read/write, read-only, random-access, sequential-access, location-addressable, file-addressable, and/or content-addressable devices.

It will be appreciated that storage machine 520 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 510 and storage machine 520 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 implemented to perform a particular function. In some cases, a module, program, or engine may be instantiated via logic machine 510 executing instructions held by storage machine 520. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 550 may be used to present a visual representation of data held by storage machine 520. This visual representation may take the form of a graphical user interface (GUI). As the herein described methods and processes change the data held by the storage machine, and thus transform the state of the storage machine, the state of display subsystem 550 may likewise be transformed to visually represent changes in the underlying data. Display subsystem 550 may include one or more display devices utilizing virtually any type of technology. Such display devices may be combined with logic machine 510 and/or storage machine 520 in a shared enclosure, or such display devices may be peripheral display devices.

Input subsystem 530 may interface with detection surface 560. Detection surface 560 may include one or more illumination sources 562 and two or more single-pixel optical sensors 565. Illumination source 562 may be configured to illuminate at least a portion of a coordinate space 570 located adjacent to detection surface 560. Optical sensors 565 may be configured to detect illumination output by illumination source 562 that reflects off of objects within coordinate space 570. In some examples, illumination source 562 may emit modulated probe light of an infrared (IR) or near-infrared (NIR) wavelength band. The probe light may be modulated temporally according to any suitable modulation waveform, including, but not limited to a pulsed or sinusoidal waveform. The nature of the modulated light source may differ in the various embodiments of this disclosure. In some embodiments, the modulated light source may include one or more modulated lasers, such as an IR or NIR laser. More particular examples include edge emitting lasers or vertical-cavity surface-emitting lasers (VCSELs). In other embodiments, the modulated light source may include one or more high-power light-emitting diodes (LEDs).

In some embodiments, Optical sensors 565 may include one or more sensing elements. Each sensing element may include one or more finger gates, transfer gates and/or collection nodes epitaxially formed on a semiconductor substrate. The sensing elements of each single-pixel optical sensor may be addressed so as to provide two or more integration periods synchronized to the emission from the illumination source. The integration periods may differ in phase and/or total integration time. Based at least in part on the relative amount of differential (and in some embodiments common mode) charge accumulated on the sensing elements during the different integration periods, the distance out to a corresponding locus of an object within coordinate space 570 may be assessed. In some embodiments, illumination source 562 and a first sensing element are energized concurrently, while a second sensing element is energized 180° out of phase with respect to the first sensing element. Based at least in part on the relative amount of charge accumulated on the first and second sensing elements, the phase angle of the reflected light pulse received at the pixel is computed versus the probe modulation. From that phase angle, the distance out to the corresponding locus may be assessed.

While the above description emphasizes one type of time-of flight imaging, the detection surface 560 may differ in the various embodiments of this disclosure.

Input subsystem 530 may further comprise or interface with one or more additional user-input devices such as a keyboard, mouse, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 540 may be configured to communicatively couple computing system 500 with one or more other computing devices. Communication subsystem 540 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A system for determining a position of one or more objects relative to a detection surface, comprising:
   a first illumination source located at a first fixed position relative to the detection surface, the first illumination source configured to illuminate at least a portion of a coordinate space located adjacent to the detection surface;
   two or more single-pixel optical sensors located at fixed positions relative to the detection surface and arranged such that each point of the coordinate space which the first illumination source is configured to illuminate, is within a field of view of at least two of the two or more single-pixel optical sensors, each of the single-pixel optical sensors is configured to detect illumination reflected off an object within the coordinate space, and further configured to output information useable to assess a time-of-flight of the detected reflected illumination; and
   a controller configured to assess a radial distance between each of the single-pixel optical sensors and the object based at least in part on the time-of-flight of the detected reflected illumination, and further configured to determine a position of the object in the coordinate space based at least in part on the radial distances between the object and the two or more single-pixel optical sensors.

2. The system of claim 1, wherein the two or more single-pixel optical sensors include:
   a first single-pixel optical sensor located at the first fixed position relative to the detection surface; and
   one or more single-pixel optical sensors located at known positions relative to the first fixed position.

3. The system of claim 2, wherein the first single-pixel optical sensor is a master single-pixel optical sensor, and wherein the one or more single-pixel optical sensors located at known positions relative to the first fixed position are slave single-pixel optical sensors, the slave single-pixel optical sensors communicatively coupled to the master single-pixel optical sensor via a clock signal.

4. The system of claim 2, further comprising:
   one or more additional illumination sources, each illumination source located at a unique location relative to the detection surface, and each illumination source configured to output illumination with at least one property unique to that illumination source, and further configured to illuminate at least a portion of the coordinate space located adjacent to the detection surface.

5. The system of claim 4, wherein each illumination source is paired to a master single-pixel optical sensor located at the unique location occupied by the paired illumination source, each master single-pixel optical sensor is configured to detect illumination output by the paired illumination source that has been reflected off a nearest object within the coordinate space, and is further configured to output information useable to assess a time-of-flight of the detected reflected illumination.

6. The system of claim 5, wherein the controller is further configured to:
   assess a radial distance between each master single-pixel sensor and a nearest object in the coordinate space based at least in part on the time-of-flight of the detected reflected illumination, and further configured to determine a position of one or more objects in the coordinate space based at least in part on the radial distances between the one or more objects and the master single-pixel optical sensors.

7. The system of claim 5, wherein each master single-pixel optical sensors is communicatively coupled to one or more slave single-pixel optical sensors via a clock signal, the one or more slave single-pixel optical sensors located at known positions relative to the coupled master single-pixel optical sensor.

8. The system of claim 4, wherein each illumination source is configured to output illumination with a unique wavelength.

9. The system of claim 4, wherein each illumination source is configured to output illumination pulsations, and wherein a timing of the illumination pulsations for each illumination source is offset from the illumination pulsations output by each other illumination source.

10. The system of claim 2, wherein the coordinate space is a three-dimensional space located adjacent to the detection surface, and where at least two single-pixel optical sensors are located at known positions relative to the first fixed position.

11. The system of claim 10, wherein the determined position of the object in the coordinate space includes a distance of the object from the detection surface.

12. The system of claim 11, wherein the controller is further configured to:
   indicate an object in contact with the detection surface based at least in part on the distance of the object from the detection surface being less than a threshold.

13. The system of claim 2, wherein the position of the object in the coordinate space is adjusted based at least in part on an indication that a diameter of the object is greater than a threshold.

14. The system of claim 1, wherein each single-pixel optical sensor is configured to view the coordinate space through an aperture configured to limit the field of view of the single-pixel optical sensor.

15. The system of claim 1, wherein the coordinate space is a two-dimensional space located parallel to the detection surface.

16. The system of claim 1, wherein the detection surface further comprises one or more contact sensors configured to output information usable to determine that one or more objects are in contact with the detection surface.

17. The system of claim 1, wherein the detection surface further comprises a display surface.

18. The system of claim 1, wherein the information useable to assess a time-of-flight of the detected reflected illumination includes a signal indicating a relative amount of illumination detected by the single-pixel optical sensor during a gating period, and wherein the controller determines the time-of-flight of the detected reflected illumination based at least in part on the signal.

19. A method for detecting the location of an object relative to a detection surface, comprising:
   illuminating a coordinate space located adjacent to the detection surface with an illumination source located at a first fixed position relative to the detection surface;
   communicatively coupling a master single-pixel optical sensor located at the first fixed position with one or more slave single-pixel optical sensors located at known distances from the first fixed position, the one or more slave single-pixel optical sensors arranged such that each point of the coordinate space illuminated by the illumination source is within a field of view of at least two single-pixel optical sensors;
   at the master single-pixel optical sensor, detecting illumination reflected off an object located in the coordinate space;
   determining a radial distance between an object located in the coordinate space and the master single-pixel optical sensor based at least in part on a time-of-flight of the reflected illumination detected by the master single-pixel optical sensor;
   at the one or more slave single-pixel optical sensors, receiving illumination reflected off the object located in the coordinate space;
   determining a radial distance between the object located in the coordinate space and the one or more slave single-pixel optical sensors based at least in part on a time-of-flight of the reflected illumination detected by one or more slave single-pixel optical sensors and further based at least in part on the known distances from the one or more slave single-pixel optical sensors to the first fixed position; and
   determining a location of the object within the coordinate space based at least in part on the determined radial distances.

20. A system for detecting the location of an object relative to a detection surface, comprising:
   a first illumination source located at a first fixed position relative to the detection surface, the first illumination source configured to illuminate at least a portion of a coordinate space located adjacent to the detection surface;
   a first single-pixel optical sensor paired to the first illumination source at the first fixed position and configured to receive reflected illumination output by the first illumination source;
   a second illumination source located at a second fixed position relative to the detection surface, the second illumination source configured to illuminate at least a portion of the coordinate space located adjacent to the detection surface, and further configured to output illumination with at least one illumination property different from illumination output by the first illumination source;
   a second single-pixel optical sensor paired to the second illumination source at the second fixed position and configured to receive reflected illumination originating at the second illumination source; and
   a controller operable to:
      determine a first radial distance indicating a distance from an object located in the coordinate space to the first single-pixel optical sensor based at least in part on a time-of-flight of illumination output by the first illumination source and received at the first single-pixel optical sensor;
      determine a second radial distance indicating a distance from the object located in the coordinate space to the second single-pixel optical sensor based at least in part on a time-of-flight of illumination output by the second illumination source and received at the second single-pixel optical sensor; and
      determine a location of the object located in the coordinate space based at least in part on the first and second radial distances.

* * * * *